United States Patent [19]
Rodriguez

[11] Patent Number: 5,338,590
[45] Date of Patent: Aug. 16, 1994

[54] ENCAPSULATED LIQUID ADHESIVE CARRIER

[76] Inventor: Peter A. Rodriguez, 1785 Selva Marina Dr., Atlantic Beach, Fla. 32233

[21] Appl. No.: 81,556

[22] Filed: Jun. 23, 1993

[51] Int. Cl.5 ............................................. C09J 7/02
[52] U.S. Cl. ...................................... 428/40; 428/42; 428/321.5
[58] Field of Search ........................ 428/40, 42, 321.5

[56] References Cited

U.S. PATENT DOCUMENTS

| | | | |
|---|---|---|---|
| 2,889,922 | 6/1959 | Clarvoe | 428/321.5 |
| 4,100,681 | 7/1978 | Hollander | 428/321.5 |
| 4,273,827 | 6/1981 | Sweeney | 428/321.5 |

Primary Examiner—Jenna L. Davis
Attorney, Agent, or Firm—Arthur G. Yeager

[57] ABSTRACT

A laminated carrier containing, between a base sheet and a cover sheet, a plurality of encapsulated liquid adhesive bubbles in spaced apart locations. The laminated carrier includes an adhesive backed paper strip including tear perforations between adjacent liquid adhesive bubbles, and a crush resistant element in the form of a wire may be laminated with the paper. The wire may have a sharp edge or apex facing upwardly from the base sheet. The strip may include other spaced liquid filled bubbles alongside the adhesive filled bubbles.

16 Claims, 2 Drawing Sheets

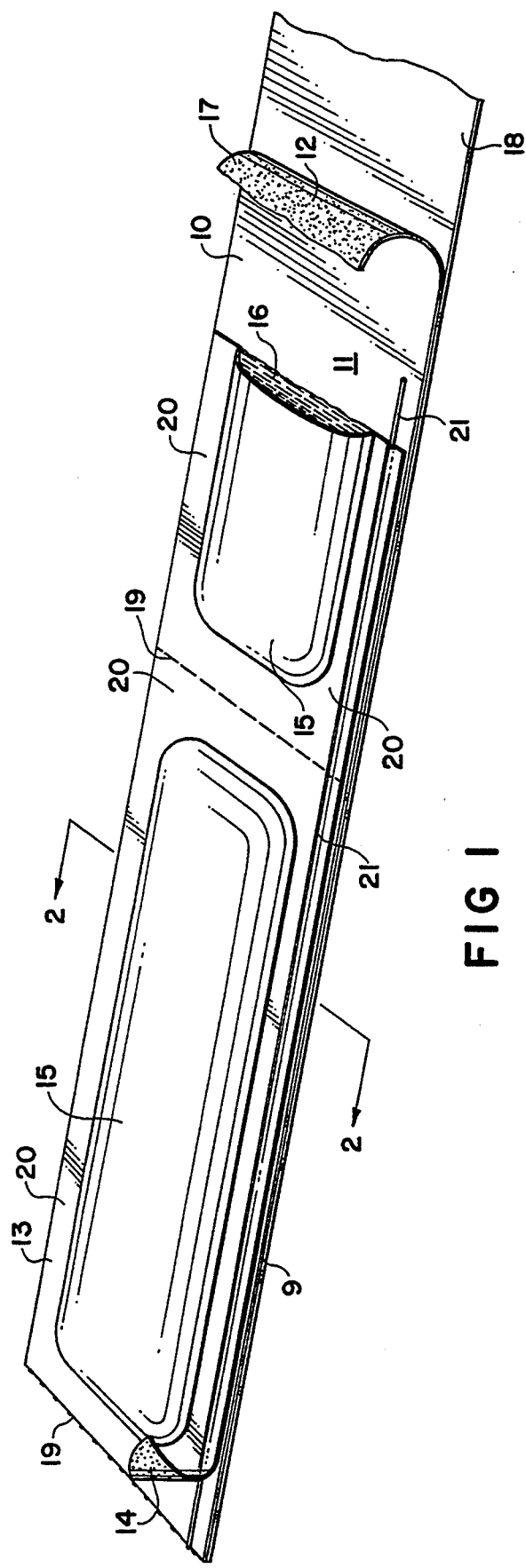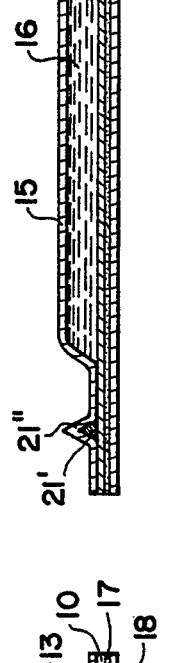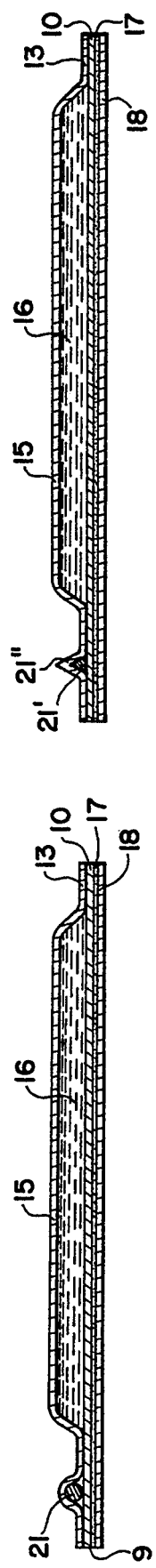

ENCAPSULATED LIQUID ADHESIVE CARRIER

BACKGROUND OF THE INVENTION

The environment in which two articles are attached to each other by a liquid glue is an important factor in how well the two articles adhere to each other. In dusty areas the liquid glue may become so contaminated with dust particles that the glue becomes substantially useless for attaching one article to another. Other degrading effects may occur in environments of high or low humidity, high or low temperature, etc. There has not been available a means for protecting a liquid adhesive from the damaging effects of the environment until it is ready for use.

It is an object of this invention to provide an article of manufacture which incorporates several separate, spaced small volumes of liquid adhesive in a carrier that are easily rupturable so as to release the adhesive. It is a special object of this invention to provide an elongated strip preferably of paper which includes a plurality of spaced, encapsulated volumes of glue that are released by rupturing the capsules. Additional objects are to provide a weakening means with the carrier which scores or otherwise weakens a paper web when the strip is used in a turn-up system for such webs. Still other objects will become apparent from the more detailed description which follows.

BRIEF SUMMARY OF THE INVENTION

This invention relates to a strip of laminated materials containing encapsulated liquid adhesive.

In specific embodiments of this invention the laminated strip includes a continuous length of paper and wire, and the strip finds a particular utility in the paper making industry as a turn-up tape used to transfer a rapidly travelling web of paper from a full roll to a new spool.

In still other embodiments the strip, without the inclusion of the wire, may be employed to apply glue to an elongated joint between two pieces of material. Alongside of the encapsulated liquid adhesive, other spaced liquid filled capsules may be provided, filled with water, for example, that would improve the use of the strip as a turn-up tape on lighter paper webs.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a perspective view of the laminate carrier in accord with the first embodiment of the invention in the form of an elongated strip;

FIG. 2 is a cross-sectional view taken at 2—2 of FIG. 1;

FIG. 3 is a view similar to FIG. 2 showing a second embodiment of the invention;

DETAILED DESCRIPTION OF THE INVENTION

Figure 4:
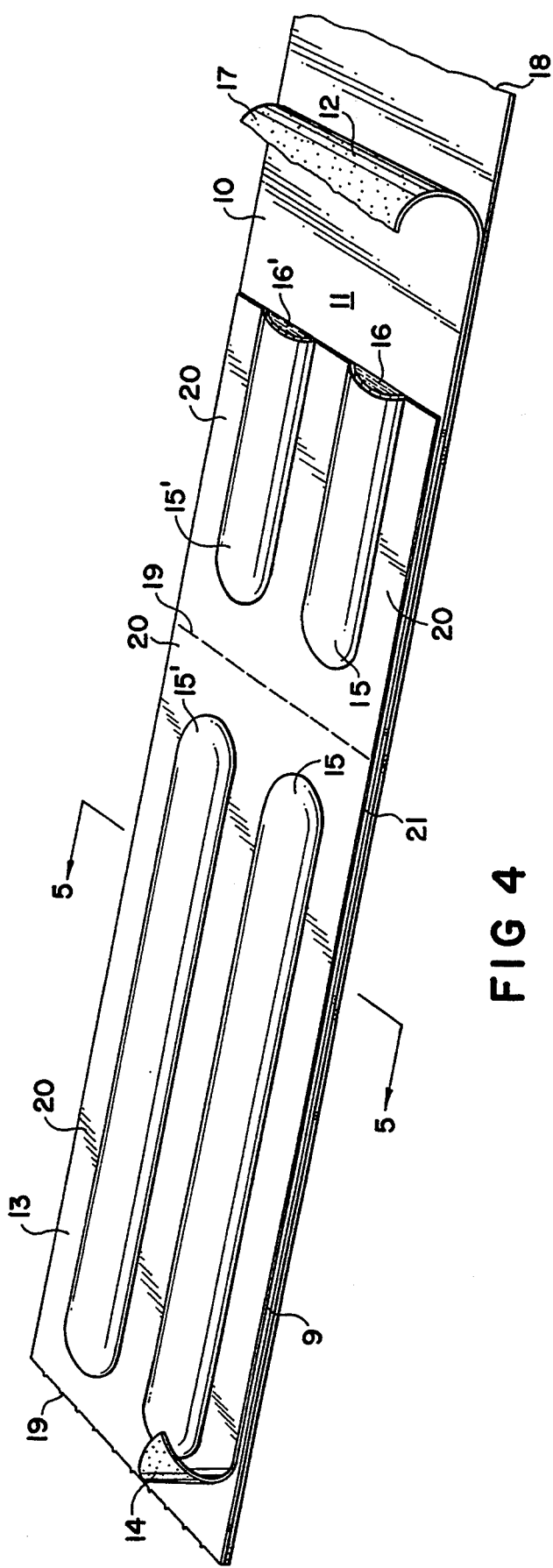
FIG. 4 is a perspective view of the laminate carrier in accord with the third embodiment of the invention.

This invention is best understood by reference to the attached drawings showing the laminate carrier as including a strip of paper.

The invention, in the form of a strip 9 of a laminate carrier is shown in FIGS. 1 and 2. The strip 9 has three layers 10, 13 and 18. The central layer 10 is referred to as the base sheet, and is a sheet of paper having an upper surface 11 and a lower surface 12. Upper surface 11 is coated with a heat-softenable coating of plastic. Preferably the coating is a polyolefin, such as polyethylene, although other thermoplastic materials will function in this capacity, e.g., polyamides, polyvinyls, polyacrylics, and the like. The lower surface 12 of base sheet 10 is coated with a pressure-sensitive adhesive 17, such as the adhesive on "Scotch" tape. Release layer 18 is pressed against the pressure-sensitive adhesive coating 17 on base sheet 10. This effectively protects the pressure-sensitive adhesive layer 17 against unintentional attachment to anything until release layer 18 is removed. Release layer 18 may be a plastic film that does not securely adhere to the pressure-sensitive adhesive 17, or preferably a paper layer coated with a silicone material which does not securely adhere to pressure-sensitive adhesive 17.

The upper sheet in the three-layer laminate of this invention is cover sheet 13. Lower surface 14 of cover sheet 13 is coated with a heat-softenable plastic, preferably the same as that on upper surface 11 of base sheet 10. These two opposing plastic-coated surfaces 11 and 14 may be pressed together under heat to produce a heat-seal bond in areas 20 as shown in FIG. 1. Small volumes of liquid adhesive (or glue) 16 are formed as bubbles or capsules 15 between base sheet 10 and cover sheet 13 when those sheets are heat-sealed together. Small puddles of adhesive may be poured onto base sheet 10 immediately before cover sheet 13 is heat-sealed to base sheet 10, thusly forming capsules or bubbles 15 of glue 16. Of course, other methods of manufacture may be performed including depositing the glue into the open end of the forming capsules 15 before completely sealing thereof. The main portion of base sheet 10 and cover sheet 13 preferably is paper. The bubble portion 15 of cover sheet 13 must be sufficiently weak to be easily ruptured when bubble 15 is squeezed. Generally, this means that the paper portion of cover sheet 13 should be just strong enough to contain the bubble 15 of glue but not much stronger than that. The heat seal in certain constructions may be weaker by design than the paper portion so that the seal ruptures to release the glue from the bubbles 15.

The pattern of bubbles 15 is not especially important so long as the volume of glue 16 inside the bubbles 15 will spread outwardly when the bubbles are ruptured so as to cover the entire area to be bonded with glue.

Regularly spaced tear-off lines 19 of perforations are provided so that the strip may be torn off to desired lengths by the user. Those tear-off lines 19 will pass through heat-sealed areas 20 so as to avoid any and all bubbles 15 of glue 16.

When the laminated strip 9 of this invention is to be used as a turn-up tape in the cutting and transferring of a travelling web of paper (not shown) to a new empty winding spool or roll (not shown) there may be incorporated into the strip of this invention a scoring wire 21. Light paper, like tissue paper, can be torn without the assistance of a wire 21, but heavier wrapping paper normally will not tear so easily, and in this case a wire 21 is desirable. Wire 21 provides the necessary score cutting across a rapidly travelling web of paper, regardless of its width, to cause a transfer of that web onto an empty roll by the bursting of the glue bubbles 15 on the strip 9 attached to the empty roll. The wire 21 preferably is located between base sheet 10 and cover sheet 13 so as to be held in place by the heat-sealed surfaces 20 adjacent to wire 21. The wire is continuous and must be cut separately when the strip is torn to a length along one of the perforated lines 19. For example, cutting wire 21 may be a metallic element, a resin impregnated fiberglass cord or any other substantially crush resistant element. The cross-sectional shape of wire 21 may be of differing forms, somewhat dependent on the tenacity of the material forming the web to be cut. A triangular shaped wire 21' is shown in the embodiment of FIG. 3, and wire 21' has an apex 21" located upwardly and perpendicular to the strip 9 thereby enhancing the scoring efficiency of the strip. In practice the strip is attached to and along an empty roll with the adhesive layer 17 adhered to the roll. The wire 21 or 21' will be facing outwardly and engage the paper web with the empty roll and paper web will be transferred to such empty roll due to the sudden change of direction of such paper web attached via the bursting glue bubbles 15 to such empty spool at the nip.

Figure 5:
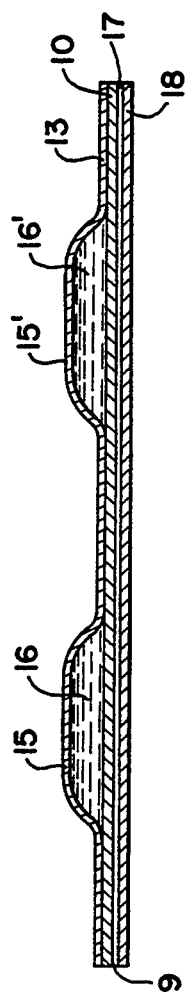
FIG. 5 is a cross-sectional view taken at 5—5 of FIG. 4.

The third embodiment of the laminate carrier is shown in FIGS. 4 and 5 wherein like numerals denote the same components as in the embodiments of FIGS. 1-3. The capsules or bubbles 15 contain glue 16 while the capsules or bubbles 15' contain another liquid 16', for example, water, which would render the strip 9 particularly useful in turn-ups in paper manufacture. With non-wet strength paper webs, i.e., like toilet paper, the strip 9 of FIGS. 4 and 5 can be applied to an empty spool such that the water filled bubbles 15' would be rotated first into the nip point between the empty spool and the filled spool before the glue 16 is squeezed out of the ruptured bubbles 15, thus soaking a narrow weakened line portion across the paper web and such paper web would rupture along such narrow weakened line portion to enhance the turn-up by the paper web changing direction since it is being glued to empty spool and to the strip 9 attached to the empty spool. As shown, it is preferable to have bubbles 15 spaced from and alongside or parallel to bubbles 15' so that full advantage may be taken of the perforated tear-off lines 19 of the strip 9.

The strip, without wire 21, may be used as a glue strip when joining two surfaces, e.g., two pieces of wood. After trial-positioning the strip to see where it should be placed, release film 18 is removed and the remaining strip is positioned on one of the pieces of wood to be joined, and is held in place by gently pressing pressure-sensitive adhesive coating 17 against the wooden piece. The second wooden piece may then be clamped in place, the pressure of the clamp causing bubbles 15 to rupture and the encapsulated glue 16 to spread in all directions. The joint will, therefore, include the glue 16 and all portions of the glue strip, i.e., sheets 10 and 13, in the final joint, but those portions should not be noticeable. In other uses, the laminate of this invention including the glue carrier may be in the form of a large sheet instead of a strip. Bubbles 15 of glue 16 may be formed on both sides of base sheet 10, with the adhesive from bubbles 15 escaping from both sides of base sheet 10 when the bubbles are pressed and ruptured.

Other uses for the glue carrier of this invention include a means for attaching paper or fabric or other sheet-like materials to a new roll before winding the material onto the roll.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A laminate carrier comprising an elongated base sheet having top and bottom surfaces, an elongated cover sheet sealed discontinuously to said top surface so as to provide separate small volumes filled with liquid adhesive between said cover sheet and said base sheet, an elongated layer of pressure-sensitive adhesive on said bottom surface, an elongated release film covering said pressure-sensitive adhesive layer, and an elongated substantially crush resistant element extending along said base and cover sheets and being sealed therebetween adjacent said small volumes.

2. The carrier of claim 1 having perforations laterally across said laminate in sealed areas between adjacent volumes of liquid adhesive.

3. The carrier of claim 1 wherein said base sheet is paper, said cover sheet and said base sheet each have a plastic coated surface, each of said plastic coated surfaces of said cover sheet and said base sheet being sealed together.

4. The carrier of claim 1 wherein said element has a triangular cross-section with an apex extending vertically upwardly from said base sheet.

5. The carrier of claim 1 wherein said cover sheet is easily ruptured manually at locations of said volumes filled with liquid adhesive are enclosed thereby.

6. The carrier of claim 1 wherein said small volumes filled with liquid adhesive are rupturable along sealed portions of said small volumes.

7. The carrier of claim 1 wherein said element is in the form of a continuous length of wire.

8. A laminate carrier comprising a base sheet having top and bottom surfaces, a cover sheet sealed discontinuously to said top surface so as to provide separate small volumes filled with liquid adhesive between said cover sheet and said base sheet, a layer of pressure-sensitive adhesive on said bottom surface, a release film covering said pressure-sensitive adhesive layer, small other volumes filled with a non-adhesive liquid being spaced alongside of said volumes of liquid adhesive and adapted to be ruptured prior thereto.

9. The carrier of claim 8 wherein each said base and cover sheets are elongated.

10. An elongated laminated strip containing spaced small volumes of liquid adhesive, said laminated strip comprising a base sheet of paper having an upper plastic-coated surface and a lower surface, a cover sheet of paper having a plastic-coated surface, said plastic-coated surface of said cover sheet and said plastic-coated surface of said base sheet being heat-sealed to each other with a plurality of spaced small separate volumes of liquid adhesive therebetween, said lower surface of said base sheet being covered with a coating of pressure-sensitive adhesive, a release layer covering said pressure-sensitive adhesive, an elongated substantially crush resistant element carried by and between said base sheet and cover sheet and being sealed therebetween adjacent said small volumes.

11. The strip of claim 10 which additionally includes a plurality of spaced lateral lines of tear-off perforations between adjacent said volumes of liquid adhesive.

12. The strip of claim 10 wherein said plastic-coated surface of said cover sheet is easily rupturable under manual pressure.

13. The strip of claim 10 wherein said element has a triangular cross-section with an apex extending vertically upwardly from said base sheet.

14. The strip of claim 10 wherein heat sealed portions define at least a boundary portion of said small volumes filled with liquid adhesive, said heat sealed portions being easily rupturable under manual pressure to release said liquid adhesive therefrom.

15. The strip of claim 10 wherein said element is in the form of a continuous length of wire.

16. The strip of claim 10 further comprising a plurality of other volumes of non-adhesive liquid spaced parallel to and along said volumes of liquid adhesive and adapted to be ruptured prior thereto.

* * * * *